(12) United States Patent
    Biffard et al.

(10) Patent No.: US 9,000,640 B2
(45) Date of Patent: Apr. 7, 2015

(54) ELECTRIC MOTOR WITH MAXIMIZED ACTIVE MOTIVE MATERIAL

(71) Applicant: Zero Motorcycles, Inc., Scotts Valley, CA (US)

(72) Inventors: Ryan John Biffard, Soquel, CA (US); Micah Benjamin Bayless, Boulder Creek, CA (US)

(73) Assignee: Zero Motorcycles, Inc., Scotts Valley, CA (US)

( * ) Notice: Subject to any disclaimer, the term of this patent is extended or adjusted under 35 U.S.C. 154(b) by 302 days.

(21) Appl. No.: 13/633,373

(22) Filed: Oct. 2, 2012

(65) Prior Publication Data

US 2014/0091654 A1    Apr. 3, 2014

(51) Int. Cl.
    H02K 3/28     (2006.01)
    H02K 3/38     (2006.01)
    H02K 3/04     (2006.01)
    H02K 5/22     (2006.01)

(52) U.S. Cl.
    CPC .. *H02K 3/28* (2013.01); *H02K 3/38* (2013.01); *H02K 3/04* (2013.01); *H02K 5/225* (2013.01)

(58) Field of Classification Search
    CPC .................................. H02K 3/28; H02K 3/38
    USPC ............... 310/71, 89, 91, 402, 405, 411, 418
    See application file for complete search history.

(56) References Cited

U.S. PATENT DOCUMENTS

| | | | | |
|---|---|---|---|---|
| 4,532,446 A | * | 7/1985 | Yamamoto et al. | 310/87 |
| 4,853,568 A | * | 8/1989 | Fujiwara | 310/68 C |
| 6,396,188 B1 | * | 5/2002 | Kliman et al. | 310/261.1 |
| 7,692,344 B2 | * | 4/2010 | Masaki et al. | 310/71 |
| 7,977,835 B2 | * | 7/2011 | Simofi-Ilyes et al. | 310/89 |
| 2007/0035197 A1 | * | 2/2007 | Usui | 310/257 |

* cited by examiner

*Primary Examiner* — Joshua Benitez-Rosario
*Assistant Examiner* — Leda Pham
(74) *Attorney, Agent, or Firm* — Gard & Kaslow LLP

(57) ABSTRACT

An electric motor configured to maximize active motive material within a given motor size by having one or more phase lead exit holes configured to prevent unwanted outside contaminants from entering the motor, phase leads each having an integral strain relief, and two or more Wye terminations that are not electrically connected to each other.

16 Claims, 6 Drawing Sheets

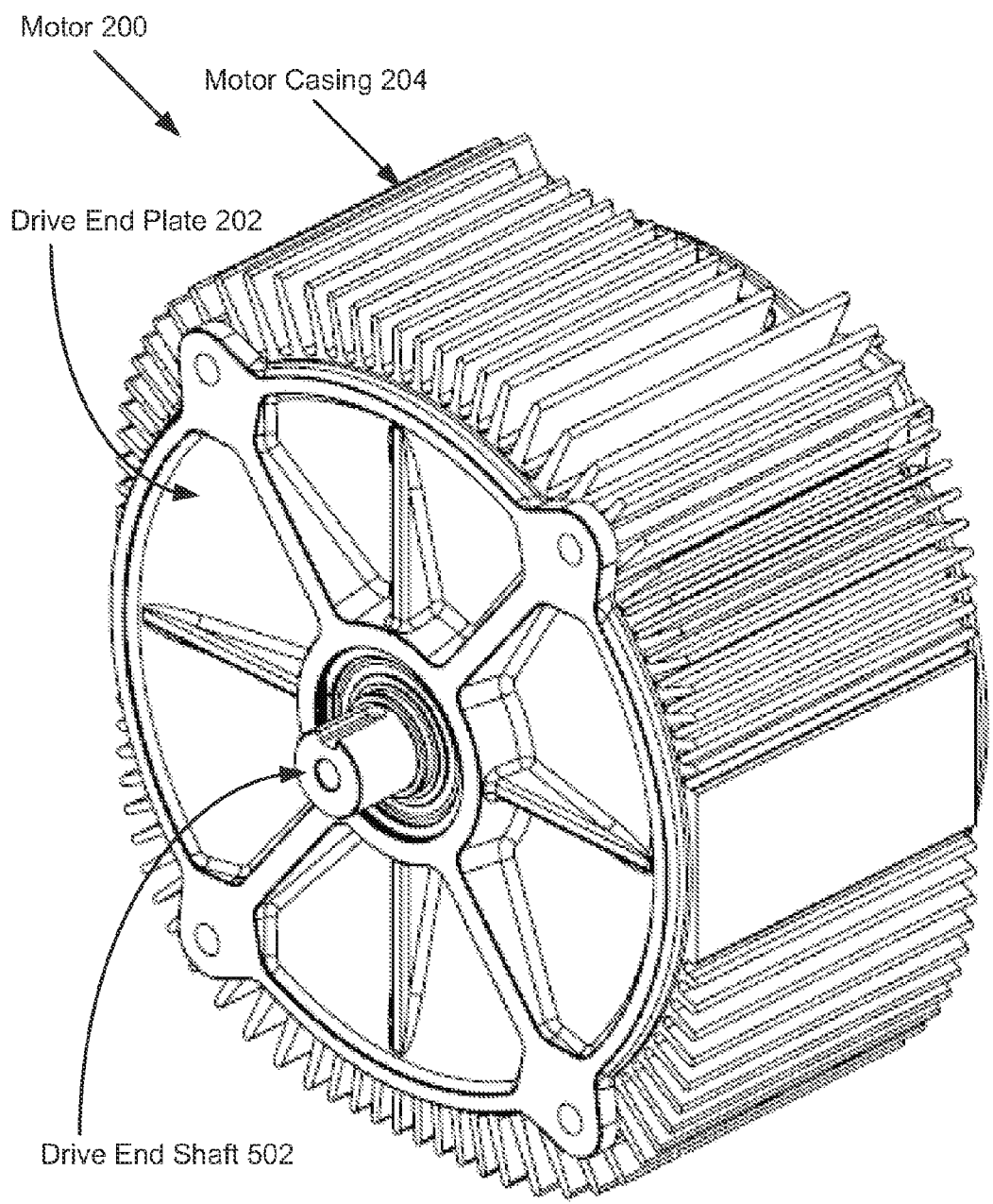

ELECTRIC MOTOR WITH MAXIMIZED ACTIVE MOTIVE MATERIAL

BACKGROUND OF THE INVENTION

1. Field of the Invention

The present invention relates generally to electric motors and, more particularly, to maximizing output power within given size constraints and operating environments of such motors.

2. Description of the Prior Art

Electric motors have been in existence for over one hundred years now. Despite this, today there is a renewed interest in them due to an ever-increasing concern about the environmental impact of other forms of power generation such as gasoline engines.

One known form of electric motors is commonly referred to as a brushless permanent magnet motor due to its design and operation. Referring now to FIG. 1, a simplified diagram of just such an electric motor can be seen. As shown in the figure, motor 100 comprises a stationary part referred to as a stator 102 and a rotating part referred to as a rotor 104. In this example, stator 102 includes three separate phase wire windings, labeled phase A wire winding 106, phase B wire winding 108, and phase C wire winding 110 in the figure, each of which includes wire wound around an armature, known as a tooth, of stator 102. As is known in the art, the space along the stator between two neighboring teeth is commonly referred to as a slot. As also shown in this example, rotor 104 includes two permanent magnet poles labeled magnet N 112 (for North) and magnet S 114 (for South), about its periphery. This stator and rotor electric motor configuration is known as an "inrunner" because the rotor is located inside the stator (versus an "outrunner" where the physical relationship between the stator and rotor is reversed) and, in either configuration, the physical space or gap between the teeth of stator 102 and the permanent magnets of rotor 104 is commonly referred to as an air gap.

In operation, a motor controller not shown) provides electric current across the three winding phases (e.g., phase A wire winding 106, phase B wire winding 108, and phase C wire winding 110) in a sequential fashion around stator 102 thus making it a three-phase motor. As current is running through a given wire winding it generates a local magnetic field which then repels and/or attracts any nearby permanent magnets such as permanent magnet N 112 and permanent magnet S 114 of rotor 104 thereby causing rotor 104 to spin or rotate about its axis. In this way, electric motor 100 can be applied to a variety of uses by, for example, having a drive gear (not shown) located on the spinning shaft 116 at the axis of rotor 104.

In further explanation and by way of example, the motor controller (not shown applies a positive voltage to one end of the phase A wire winding 106 and a negative voltage to one end of the phase B wire winding 108. This voltage differential creates an electric current from the one end of the phase A wire winding 106 to a "Wye" termination and then to the one end of the phase B wire winding 108 because, as shown in the figure, the other ends of the phase A wire winding 106 and the phase B wire winding 108 (as well as that of one of the ends of the phase C wire winding 110) are electrically connected in the form of a "Wye" termination, a form of termination connection known in the art. This electric current, as explained above, creates a magnetic field surrounding the wire windings, such as phase A wire winding 106 and phase B wire winding 108. These magnetic fields repel (and/or attract, as the case may be) respective ones of magnet N 112 and/or magnet S 114 thereby causing rotor 104 to spin about it axis. The motor controller then applies a voltage differential across one end of the phase B wire winding 108 and one end of the phase C wire winding 110 causing rotor 104 to continue to spin. The motor controller then applies a voltage differential across one end of the phase C wire winding 110 and one end of the phase A wire winding 106 causing rotor 104 to further continue to spin. This process is repeated thus continuing to cause rotor 104 to spin or rotate within stator 102.

It is to be understood that the diagram of motor 100 of FIG. 1 is a simplified form of such an electric motor. As is known in the art, increasing the size and number of the active motive elements, such as the size of the stator and the number of windings (as well as the number of wire windings on each tooth) on the stator and the size of the rotor and the number (and power) of magnets on the rotor, increases the motive force or power of the electric motor. Therefore, in practice, it is common for each of the phase wire windings to be duplicated (so that there is more than one phase A wire winding 106, more than one phase B wire winding 108, and more than one phase C wire winding 110) at additional teeth locations around a stator thereby providing additional magnetic fields to repel (and/or attract) any magnets on a rotor. Likewise, it is common for each of the magnets of a rotor to be duplicated (so that there is more than one N magnet 112 and more than one S magnet 114) thereby providing additional magnets to be repelled (and/or attracted) by a stator's wire windings.

Of course, a given motor may be limited in how large it can be for a given use case thus limiting the extent of any such increases in active motive material (e.g., the size of the stator, the number of wire windings and/or number of wire windings per tooth, the size of the rotor, and the number and power of the magnets). Additionally, even within a given motor's overall size constraints, any room taken up within the motor by components other than the active motive elements is space that could otherwise be used to increase the active motive elements and thereby improve the power of the motor.

Still further, the intended operating environment of a given motor may dictate certain motor requirements that take up space within the motor thus further limiting the space available for the active motor material. For example, a motor intended to be operated in a dusty, dirty or wet environment may have requirements that the motor be sealed from the outside world thus preventing such dust, dirt and/or moisture from entering the motor. While various motor sealing techniques are known, they generally involve adding components to the motor which components can add complexity, weight and take up physical space which can be detrimental to increasing power of the motor.

What is needed, therefore, is an improved electric motor that maximizes active motive material for a given motor size while still achieving other dictated requirements such as being sealed from outside elements, etc.

SUMMARY

In one embodiment is provided a three-phase electric motor comprising: a motor casing having an open end with three half-round lead exit holes along an edge of the open end; a stator sized to fit within the motor casing, the stator having a multiplicity of inwardly directed radial teeth with wire windings arranged thereon comprising: a first set of three stator windings, each winding of the first set of three stator windings having a positive lead and negative lead, and wherein each negative lead of the first set of three stator windings is electrically connected to form a first Wye connection; a second set of three stator windings, each winding of the second set of three stator windings having a positive lead and negative lead, and wherein each negative lead of the second set of three stator windings is electrically connected to form a second Wye connection; and wherein: a first positive lead of the first set of three stator windings is electrically connected to a first positive lead of the second set of three stator windings and to a first lead cable to form a phase A lead; a second positive lead of the first set of three stator windings is electrically connected to a second positive lead of the second set of three stator windings and to a second lead cable to form a phase B lead; a third positive lead of the first set of three stator windings is electrically connected to a third positive lead of the second set of three stator windings and to a third lead cable to form a phase C lead; and wherein each of the phase A lead, the phase B lead and the phase C lead is covered with a separate heat shrink tubing thereby electrically insulating and increasing an overall outside diameter of a portion of each respective lead; a rotor having a multiplicity of permanent magnets and sized to fit within the stator; a rotor having a multiplicity of permanent magnets and sized to fit within the stator; and, an end plate configured to attach to and cover the open end of the motor casing, an edge of the end plate including three half-round lead exit holes aligned with the three half round lead exit holes along the edge of the open end of the motor casing thereby creating three fully round lead exit holes when the end plate is attached to the motor casing and wherein: a first of the three fully round lead exit holes is configured to pass the phase A lead and is of an inside diameter that is smaller than an outside diameter of the phase A lead with the separate heat shrink tubing; a second of the three fully round lead exit holes is configured to pass the phase B lead and is of an inside diameter that is smaller than an outside diameter of the phase B lead with the separate heat shrink tubing; and a third of the three fully round lead exit holes is configured to pass the phase C lead and is of an inside diameter that is smaller than an outside diameter of the phase B lead with the separate heat shrink tubing; whereby each of the three fully round lead exit holes compresses the separate heat shrink tubing of the phase A lead, the phase B lead and the phase C lead when the end plate is attached to the open end of the motor casing thereby preventing unwanted outside contaminants from passing between the phase A lead, the phase B lead and the phase C lead and the three fully round lead exit holes into the electric motor.

In a further embodiment of the electric motor, the first Wye connection is not electrically connected to the second Wye connection.

In a still further embodiment of the electric motor, each of the phase A lead, phase B lead and phase C lead further comprises a crimped wire barrel inside the heat shrink tubing at a location along the phase A lead, the phase B lead and the phase C lead to remain inside the electric motor when the end plate is attached to the motor casing.

In a yet further embodiment is provided three-phase electric motor comprising: a motor casing having an open end with three half-round lead exit holes along an edge of the open end; a stator sized to fit within the motor casing, the stator having a multiplicity of wire windings arranged thereon comprising a heat shrink tubing covered phase A lead, a heat shrink tubing covered phase B lead, and a heat shrink tubing covered phase C lead; a rotor having a multiplicity of permanent magnets and sized to fit within the stator; and an end plate configured to attach to and cover the open end of the motor casing, an edge of the end plate including three half-round lead exit holes aligned with the three half round lead exit holes along the edge of the open end of the motor casing thereby creating three fully round lead exit holes when the end plate is attached to the motor casing and wherein: a first of the three fully round lead exit holes is configured to pass the heat shrink tubing covered phase A lead and is of an inside diameter that is smaller than an outside diameter of the heat shrink tubing covered phase A lead; a second of the three fully round lead exit holes is configured to pass the heat shrink tubing covered phase B lead and is of an inside diameter that is smaller than an outside diameter of the heat shrink tubing covered phase B lead; and a third of the three fully round lead exit holes is configured to pass the heat shrink tubing covered phase C lead and is of an inside diameter that is smaller than an outside diameter of the heat shrink tubing covered phase C lead; whereby the three fully round lead exit holes compress the heat shrink tubing covered phase A lead, the heat shrink tubing covered phase B lead and the heat shrink tubing covered phase C lead when the end plate is attached to the open end of the motor casing thereby preventing unwanted outside contaminants from passing between the heat shrink tubing covered phase A lead, the heat shrink tubing covered phase B lead and the heat shrink tubing covered phase C lead and the three fully round lead exit holes into the electric motor.

In a yet further still embodiment of the electric motor the heat shrink tubing covered phase A lead further comprises a crimped wire barrel at a location along a portion of the heat shrink tubing covered phase A lead to remain inside the electric motor when the end plate is attached to the motor casing, the heat shrink tubing covered phase B lead further comprises a crimped wire barrel at a location along a portion of the heat shrink tubing covered phase B lead to remain inside the electric motor when the end plate is attached to the motor casing, and the heat shrink tubing covered phase C lead further comprises a crimped wire barrel at a location along a portion of the heat shrink tubing covered phase C lead to remain inside the electric motor when the end plate is attached to the motor casing.

BRIEF DESCRIPTION OF DRAWINGS

FIG. 5a is front view of an electric motor according to one embodiment.

DETAILED DESCRIPTION OF THE INVENTION

Described herein are various embodiments of an electric motor configured to maximize active motive material within a given motor size by having one or more phase lead exit holes configured to prevent unwanted outside contaminants from entering the motor, phase leads each having an integral strain relief, and two or more Wye terminations that are not electrically connected to each other.

An electric motor such as that described herein is particularly well-suited for use in a motorcycle due to its size, weight, power and operating environment requirements and constraints, among other possible applications. Use of such a motor in a motorcycle imposes requirements, constraints and limitations which may not exist in other operational environments. For example, the motor must be relatively small in size to fit within a motorcycle frame, relatively light in weight yet provide enough peak power to properly drive a motorcycle, and able to operate in environments where dust, dirt and moisture are common.

Figure 2:
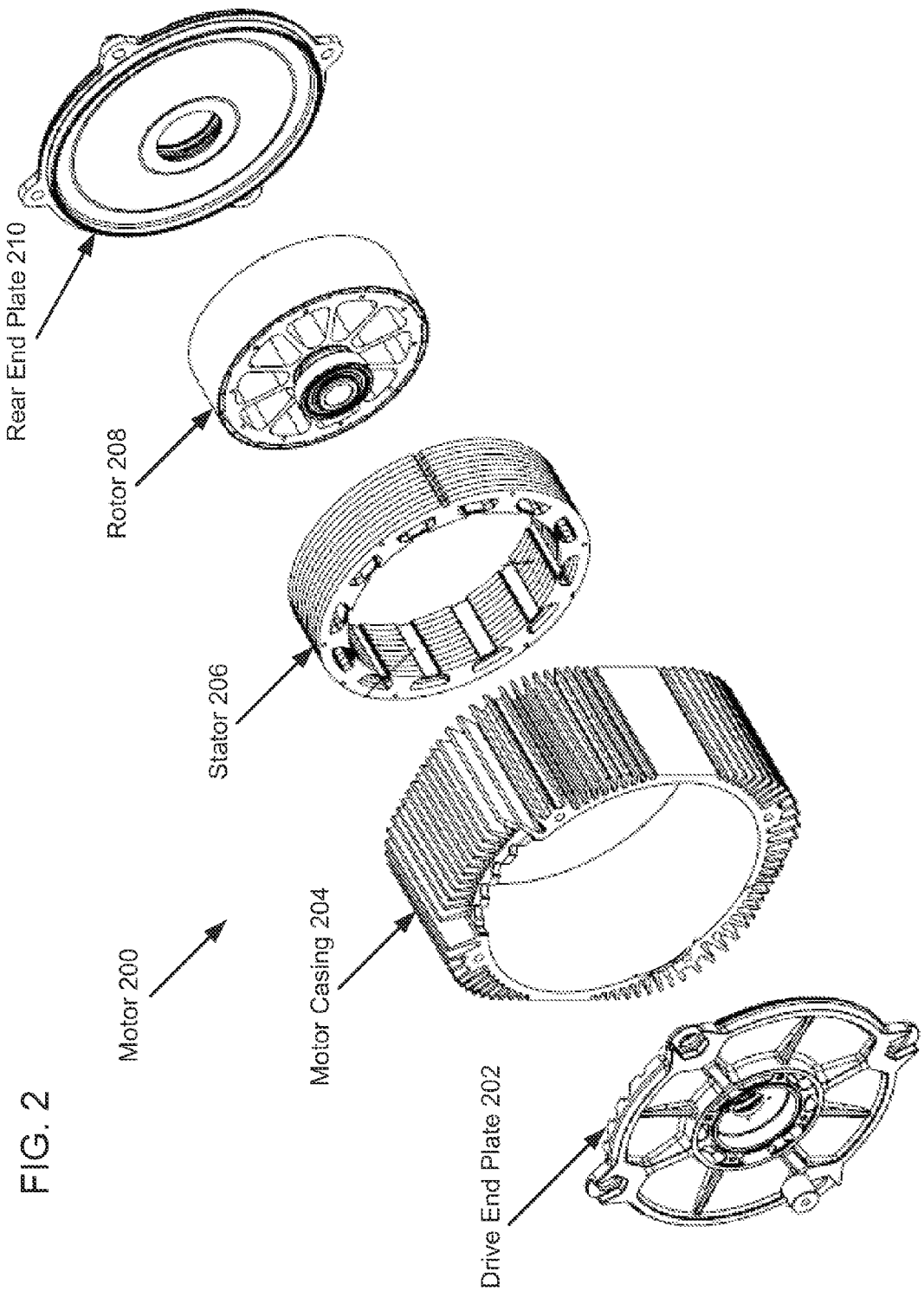
FIG. 2 is an exploded diagram of an electric motor according to one embodiment.

Referring now to FIG. 2, an exploded diagram of an electric motor 200 according to one embodiment can be seen. As shown, electric motor 200 includes a drive end plate 202, a motor casing 204 having radial heat fins for passive air cooling, a stator 206 comprising a set of stacked laminations and wire windings (not shown), a rotor 208 comprising permanent magnets located about its periphery, and a rear end plate 210.

Figure 1:
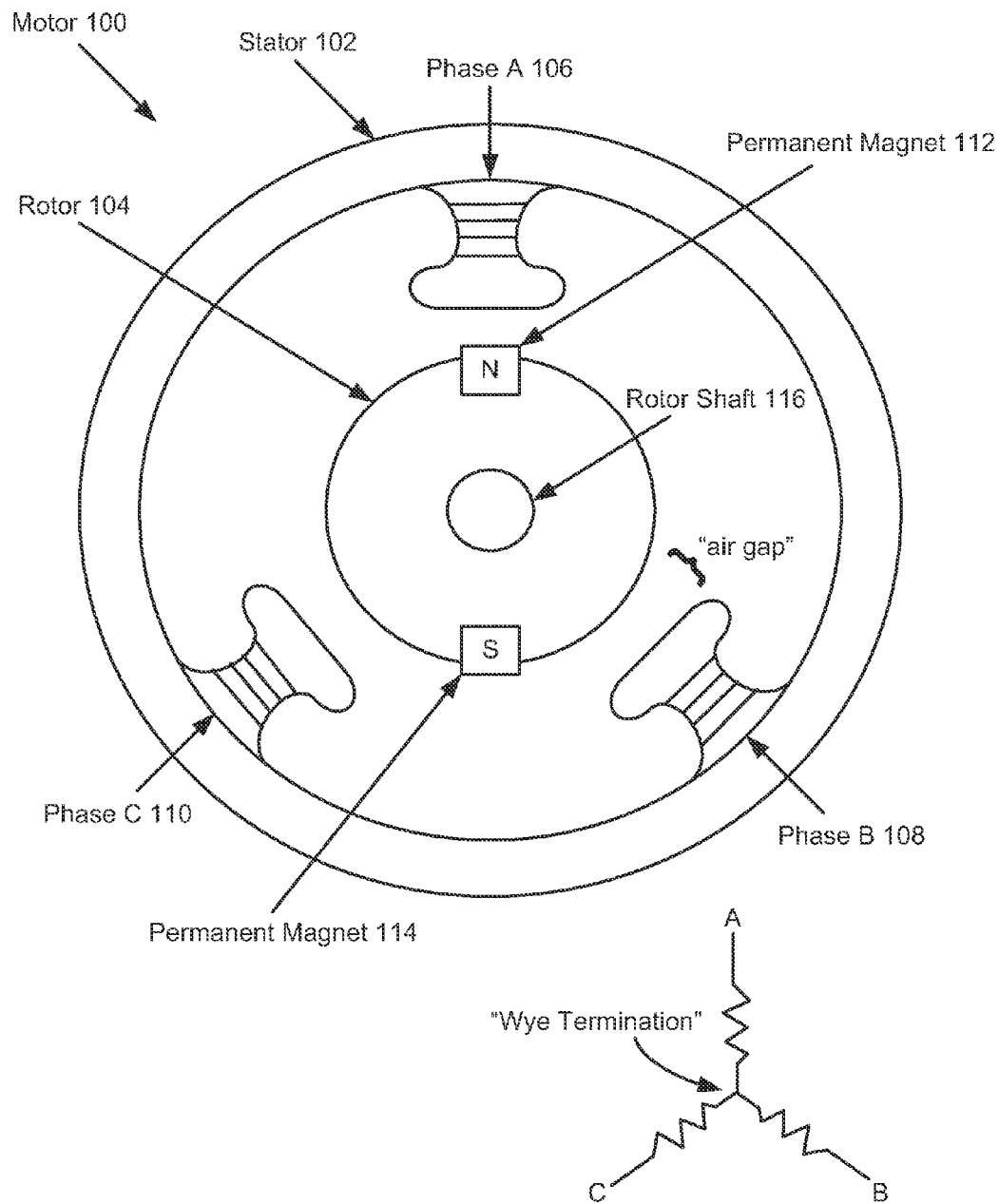
FIG. 1 is a block diagram of an electric motor of the prior art.

It is to be understood that the basic physical relationship and operation of these elements in motor 200 is generally as was described with respect to that of motor 100 of FIG. 1. In particular, rotor 208 fits within stator 206, separated by an air gap, both of which then fit within motor casing 204 with drive end plate 202 attached to and closing a front end of motor casing 204 while rear end plate 210 is attached to and closes a rear end of motor casing 204. As has been explained, rotor 208 is then caused to rotate within stator 206, by the application of a voltage differential across the wire windings on stator 206 which repel and/or attract the magnets of rotor 208.

Figure 3:
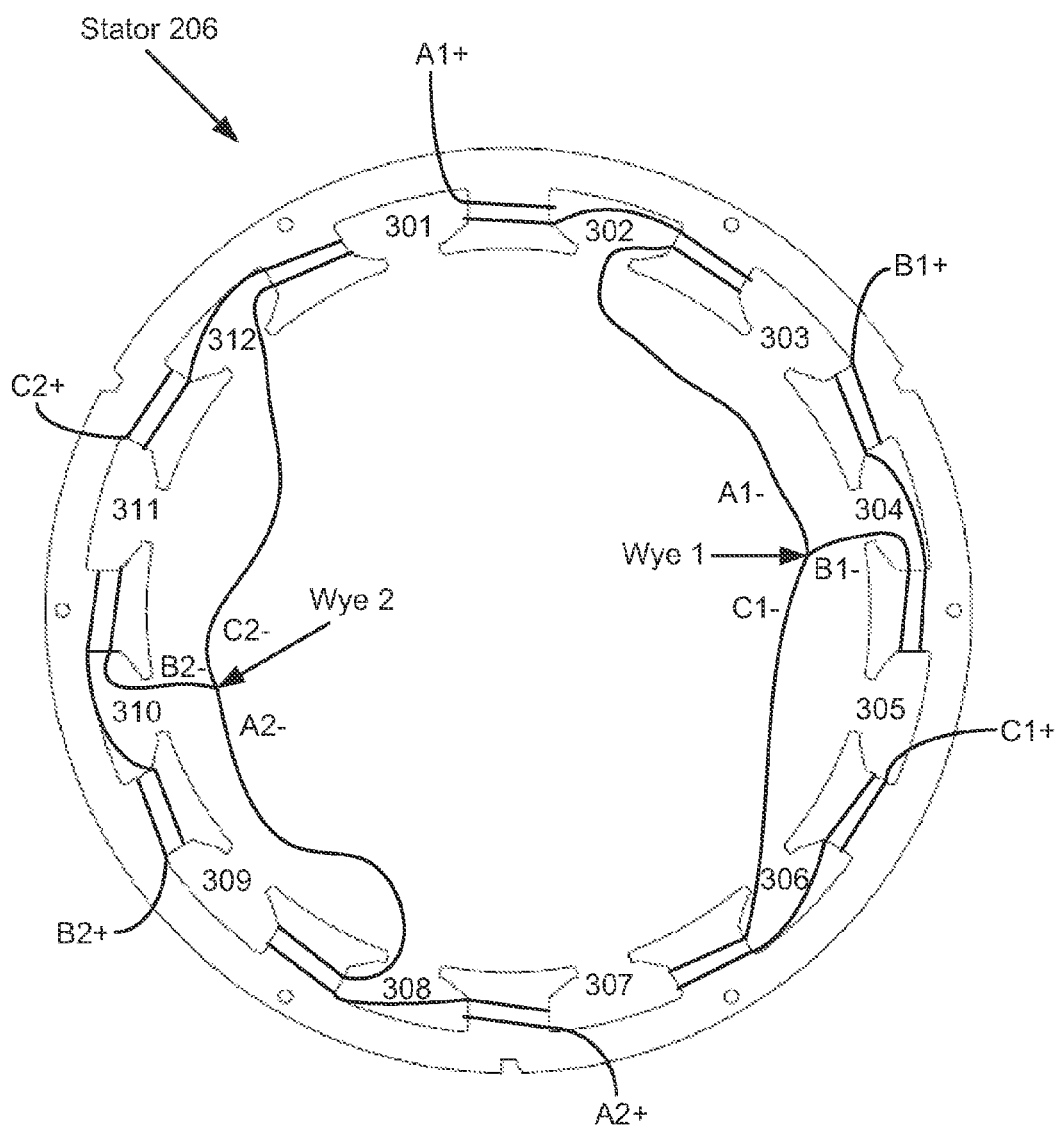
FIG. 3 is an end view of a stator according to one embodiment.

Referring now to FIG. 3, an end view of stator 206 according to one embodiment can be seen. As shown, in this embodiment stator 206 has a total of twelve teeth which define twelve slots labeled 301-312 between them and, as shown, wire is then wound around each of the twelve teeth (it being understood that the figure is not necessarily representative of the gauge of wire used, whether solid or stranded wire is used, or the actual number of wire windings around any given tooth).

In particular, wire is wound around one tooth of stator 206 between slot 301 and slot 302 and is then wound around another tooth of stator 206 between slot 302 and 303 with one end of this wire, labeled A1+, exiting stator 206 and the other end of this wire labeled A1−. Another wire is wound around one tooth of stator 206 between slot 303 and slot 304 and is then wound around another tooth of stator 206 between slot 304 and 305 with one end of this wire, labeled B1+, exiting stator 206 and the other end of this wire labeled B1−. Another wire is wound around one tooth of stator 206 between slot 305 and slot 306 and is then wound around another tooth of stator 206 between slot 306 and 307 with one end of this wire, labeled C1+, exiting stator 206 and the other end of this wire labeled C1−. As also shown, the ends of the wires labeled A1−, B1−, and C1− are all electrically connected at Wye 1 termination. As such, for electric motor 200, the wires wound around the teeth of stator 206 between slot 301 and slot 303 comprise phase A1, the wires wound around the teeth of stator 206 between slot 303 and slot 305 comprise phase B1, and the wires wound around the teeth of stator 206 between slot 305 and slot 307 comprise phase C1.

As further shown, wire is wound around one tooth of stator 206 between slot 307 and slot 308 and is then wound around another tooth of stator 206 between slot 308 and 309 with one end of this wire, labeled A2+, exiting stator 206 and the other end of this wire labeled A2−. Another wire is wound around one tooth of stator 206 between slot 309 and slot 310 and is then wound around another tooth of stator 206 between slot 310 and 311 with one end of this wire, labeled B2+, exiting stator 206 and the other end of this wire labeled B2−. Another wire is wound around one tooth of stator 206 between slot 311 and slot 312 and is then wound around another tooth of stator 206 between slot 312 and 301 with one end of this wire, labeled C2+, exiting stator 206 and the other end of this wire labeled C2−. As also shown, the ends of the wires labeled A2−, B2−, and C2− are all electrically connected at Wye 2 termination. As such, for electric motor 200, the wires wound around the teeth of stator 206 between slot 307 and slot 309 comprise phase A2, the wires wound around the teeth of stator 206 between slot 309 and slot 311 comprise phase B2, and the wires wound around the teeth of stator 206 between slot 311 and slot 301 comprise phase C2.

As is shown, stator 206 of electric motor 200 thus comprises two sets of phase A (namely A1 and A2) windings, two sets of phase B (namely B1 and B2) windings, and two sets of phase C (namely C1 and C2) windings. Further, each of these two sets of phase windings is electrically connected to a separate lead cable to create a combined phase A lead, a combined phase B lead, and a combined phase C lead, as explained below with reference to FIG. 4. This multiplicity of windings for each phase provides additional magnetic fields to repel (and/or attract) any magnets on rotor 208, as described elsewhere herein. This is furthered by the inclusion of a multiplicity of permanent magnets located along the periphery of rotor 208. As previously explained, this results in an increase in active motive material for motor 200.

Further, as explained and shown, the wire winding arrangement of stator 206 includes two Wye terminations, namely Wye 1 termination and Wye 2 termination. In a preferred embodiment, these two Wye terminations are physically separated from each other on opposite sides of stator 206 within electric motor 200 and not electrically connected to each other. This reduces the amount of physical wire needed to electrically connect the Wye 1 termination located on one side of stator 206 within electric motor 200 with the Wye 2 termination located on an opposite side of stator 206 within electric motor 200, which would otherwise require either a lengthening of wire ends A1−, B1−, and C1− and/or wire ends A2−, B2−, and C2− so that Wye 1 termination and Wye 2 termination could physically and electrically meet, or the inclusion of some additional wire placed between Wye 1 termination and Wye 2 termination to electrically connect them. Eliminating the amount of physical wire that would otherwise be used to connect Wye 1 termination to Wye 2 termination, which itself is not active motive material, thus reduces the physical space within electric motor 200 taken up by such additional wiring thereby maximizing the remaining amount of space available within electric motor 200 for active motive material as explained elsewhere herein.

Figure 4:
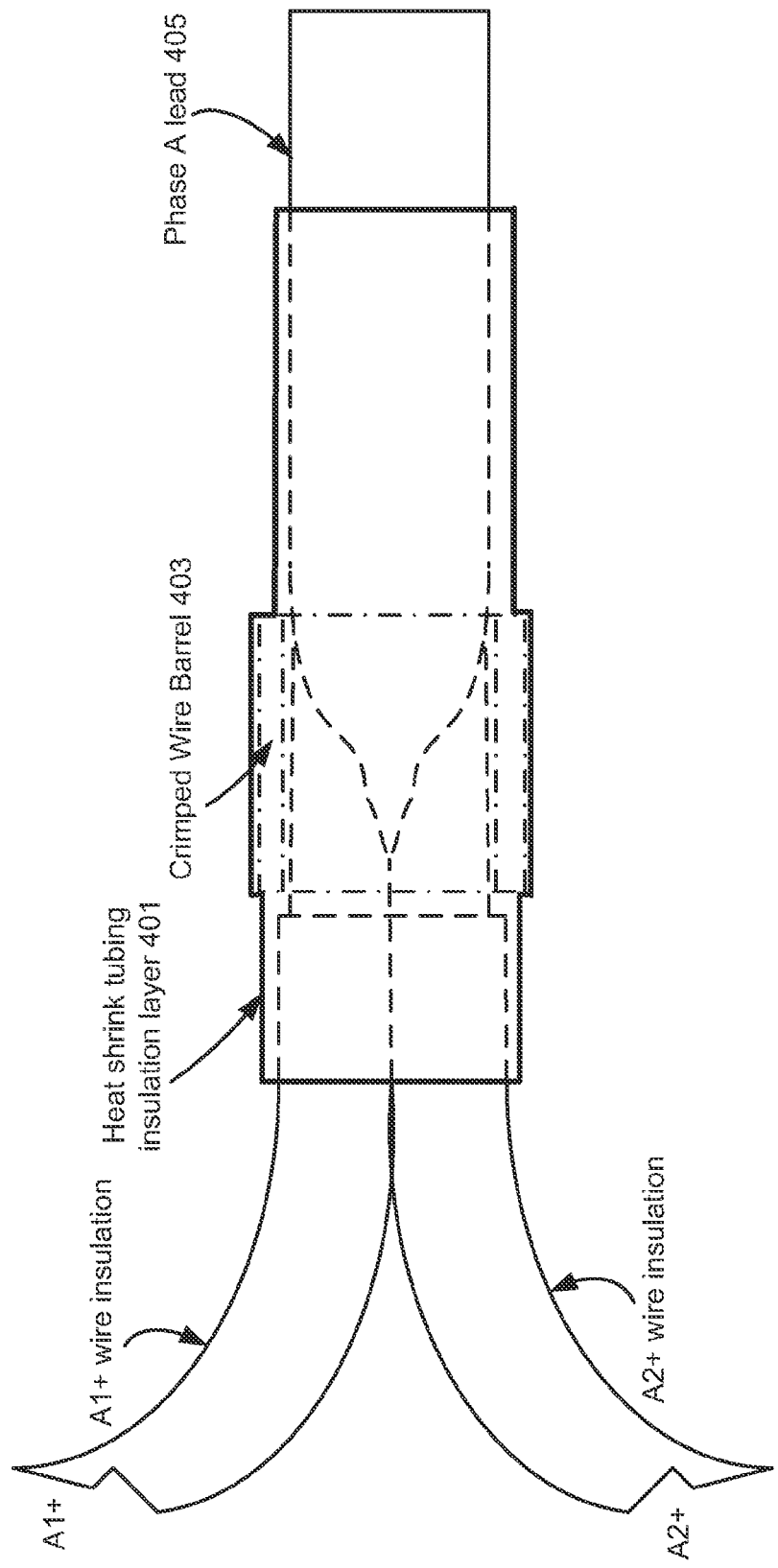
FIG. 4 is an example of electrically connecting two sets of phase leads to create a combined phase lead according to one embodiment.

Referring now to FIG. 4, an example of electrically connecting two sets of a given phase together with a lead cable to create a combined phase lead according to one embodiment can be seen. In this example, the wire end labeled A1+, which, again, is one end of the wire wound around the tooth of stator 206 between slots 301 and 303, is shown electrically connected to the wire labeled A2+, which, again, is one end of the wire wound around the tooth of stator 206 between slots 307 and 309, to create phase A lead for motor 200. This is accomplished by removing or stripping away an insulation layer surrounding some portion of the A1+ and A2+ wire ends, as indicated by the dashed portion of the A1+ and A2+ wire ends, and connecting both to a phase A lead 405, all placed within a heat shrink tubing 401 insulation layer. In one embodiment, the lead cable of phase A lead 405 is a flexible, high current cable with its own wire insulation layer and which is capable of handling the vibration and environment outside of motor 200. Further, as is known in the art, heat shrink tubing 401 is a material that shrinks when heat is applied to it thus binding and insulating any wires placed therein. In this example, the A1+ and A2+ wire winding ends are bound together by the heat shrink tubing 401 and the insulating qualities of the wire insulation of the A1+ and A2+ wire ends themselves is maintained by overlapping the heat shrink tubing with the wire insulation as is shown. Further, because the A1+ and A2+ wire ends are physically and electrically connected with the phase A lead 405 within the heat shrink tubing 401, the phase A lead 405 exiting the other end of the heat shrink tubing then becomes the phase A lead of electric motor 200.

Likewise, just as the A1+ and A2+ wire ends are connected together with a lead cable to create the phase A lead 405 of electric motor 200, it is to be understood that in this embodiment the B1+ and B2+ wire ends are likewise connected together with a lead cable to create the phase B lead of electric motor 200 and the C+ and C2+ wire ends are likewise connected together with a lead cable to create the phase C lead of electric motor 200.

In a further embodiment, the A1+ and A2+ wire ends with stripped away insulation and the lead cable which becomes the phase A lead 405 are first placed in or threaded through a wire barrel 403, otherwise known as a barrel splice, before being placed in the heat shrink tubing. In a process known as crimping, wire barrel 403 is mechanically compressed or squeezed, along with the A1+ and A2+ wire ends and the lead cable which becomes the phase A lead 405 inside, to increase the amount of surface area in contact between the A1+ and A2+ wire ends and the lead cable which becomes the phase A lead 405 thereby improving the electrical connection between them. Another benefit of crimping wire barrel 403 is to strengthen the physical connection between the A1+ and A2+ wire ends and the lead cable which becomes the phase A lead 405 thus making it more difficult to physically separate them. And while wire barrel 403 does increase the outside diameter of the resulting phase lead, it only does so for the length of wire barrel 403 itself while the remaining length of the phase lead maintains the same diameter as was the case without wire barrel 403. Further, as will be explained elsewhere herein, in some embodiments the crimped wire barrel arrangement can also provide a strain relief function for the phase A lead 405.

It is to be understood that in this further embodiment, the phase B lead and the phase C lead each also include a crimped wire barrel in a similar arrangement to that of the phase A lead described with reference to FIG. 4.

Figure 5B:
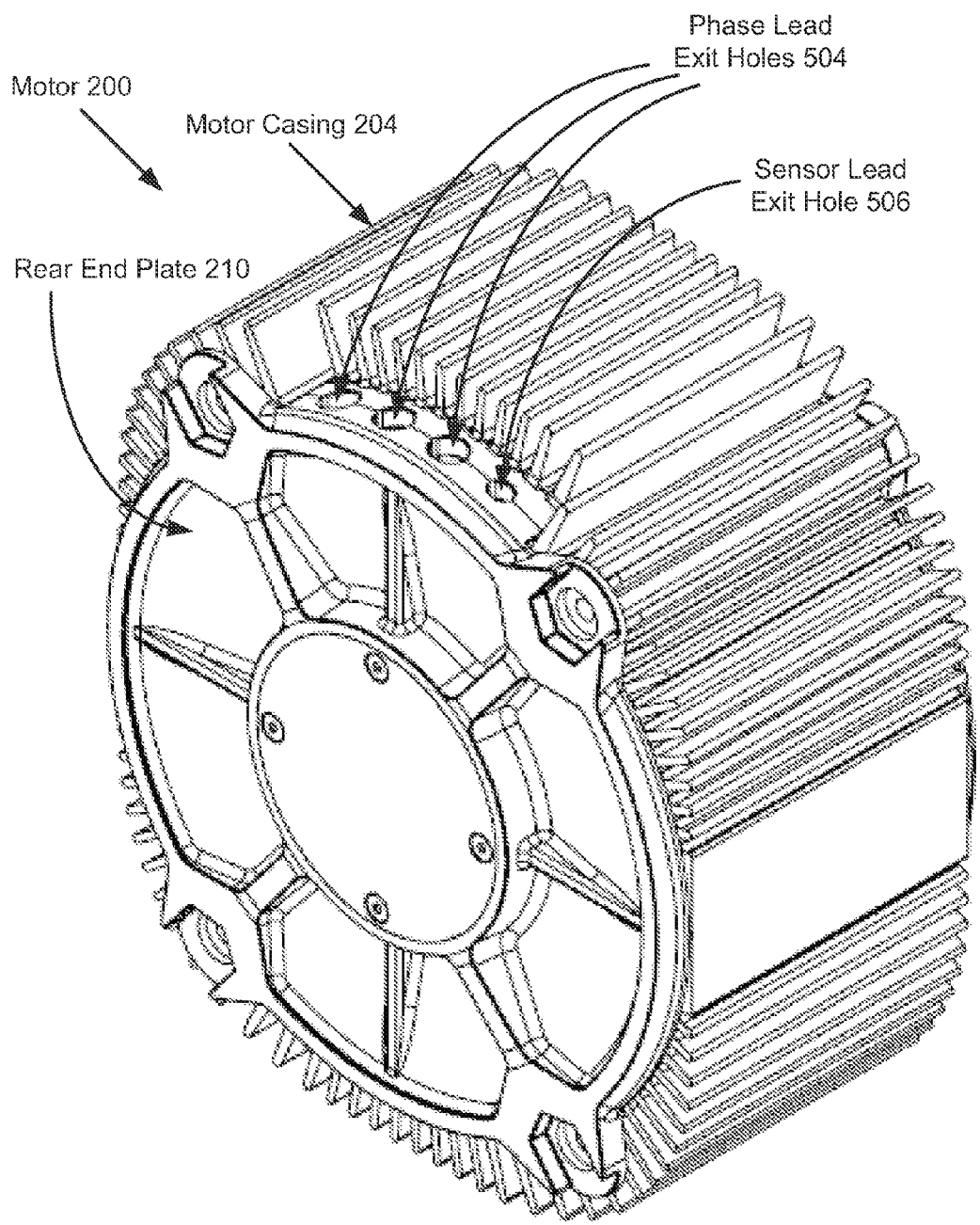
FIG. 5b is a rear view of an electric motor according to one embodiment.

Referring now to FIGS. 5a and 5b, a depiction of a front view and a rear view of electric motor 200 can be seen. In particular, with reference to FIG. 5a, drive end plate 202 has been attached to a front of motor casing 204 and, with reference to FIG. 5b, rear end plate 210 has been attached to a rear of motor casing 204. Although not shown in the figure, attaching drive end plate 202 and rear end plate 210 to motor casing 204 encloses any active motive material, such as stator 206 and rotor 208, within electric motor 200.

Of course, some electrical connection still must be made between the motor controller (not shown) located outside electric motor 200 and the phase A, phase B and phase C leads originating from stator 206 located inside electric motor 200. In the prior art, connection of stator phase leads inside an electric motor to a motor controller located outside an electric motor was accomplished by adding one or more physical connectors to the motor housing itself. In this way, the stator phase leads are attached to a portion of the physical connector(s) on the inside of the motor housing and the motor controller can make electrical connection to a portion of the physical connector(s) on the outside of the motor housing. However, the addition of one or more physical connector(s) is not without its downsides. For example, to ensure adequate strength and current carrying capability, such physical connectors must be relatively large and, further, take up space within the motor housing for the connection between the phase leads and the connector, all of which wastes valuable space which can better be used for additional active motive material within the motor. Additionally, while seeming to provide the benefit of a strain relief function for the phase lead to motor controller electrical connection, as is known in the art such physical connectors instead can become the source of wire breakage, separation and/or electrical shorts.

Referring again to FIG. 5b, an embodiment is shown of electric motor 200 that does not use physical connector(s) of the prior art. Instead, as shown, there are three phase lead exit holes 504 whereby phase A, phase B and phase C leads can exit electric motor 200. Also shown is sensor lead exit hole 506 for a sensor lead (not shown) from a sensor located inside electric 200 to also exit electric motor 200. In this embodiment, these lead exit holes in electric motor 200 are formed by half-round exit holes located along an edge of rear end plate 210 aligning with half-round exit holes located along an edge of motor casing 204 when rear end plate 210 is attached to motor casing 204 thereby forming fully round phase lead exit holes 504 in electric motor 200. In this way, when rear end plate 210 is being attached to motor casing 204, phase A, phase B and phase C leads of stator 206 (not shown) are placed within and exit from the phase lead exit holes 504 thus making them electrically accessible to the motor controller (not shown).

Further, in one embodiment, phase lead exit holes 504 (or more particularly, half-round exit holes located along an edge of rear end plate 210 and along an edge of motor casing 204) are sized to be slightly smaller than the outside diameter of the phase leads themselves, including any phase lead insulating layers (such as the phase lead wire insulation and/or heat shrink tubing as described with reference to FIG. 4) but not including any included wire barrel, so that when rear end plate 210 is attached to motor casing 204, the phase lead insulating layer is squeezed or compressed by the phase lead exit hole 504. Squeezing or compressing the phase lead insulating layer at the phase lead exit hole 504 provides a seal thus preventing the passage of unwanted contaminants such as dust, dirt, moisture, or other foreign matter from passing from outside electric motor 200 into the interior of electric motor 200.

In one example embodiment, each of the phase A, B and C leads is 11.0 mm in outside diameter without the heat shrink tubing and 11.5 mm in outside diameter with the heat shrink tubing. In this example embodiment, each of the phase lead exit holes 504 is 11.0 mm in inside diameter so that when the rear end plate 210 is attached to the motor casing 204 the heat shrink tubing and/or any insulating layer of the exiting phase leads is compressed thereby providing the above-described seal which prevents the passage of unwanted outside contaminants from passing between the phase leads and the lead exit holes into the electric motor.

Still further, in embodiments of phase leads that include the crimped wire barrel 403 as was explained with reference to FIG. 4, the crimped wire barrel 403 also provides a strain relief function for the exiting phase leads as will now be explained. The crimped wire barrel portion of the phase leads is kept inside the motor when the phase leads are placed in the lead exit holes 504 as part of attaching the rear end plate 210 to the motor casing 204. In this way, because the crimped wire barrel 403 increases the outside diameter of the phase lead at the location of the crimped wire barrel 403 beyond that of the interior diameter of the phase lead exit holes 504 means that the phase lead is prevented from being pulled through the phase lead exit hole thus providing a strain relief function for the phase lead exiting motor 200 which, further, avoids the possibility of wire separation as can commonly occur with physical connectors of the prior art. Further, this strain relief arrangement also takes up less physical space than the prior art physical connectors and phase lead attachments thereto, which space can better be used to maximize active motor material within the motor.

As has now been explained, an improved electric motor is configured to maximize active motive material within a given motor size by having one or more phase lead exit holes configured to prevent unwanted outside contaminants from entering the motor, phase leads each having an integral strain relief, and two or more Wye terminations that are not electrically connected to each other.

In one example implementation of the electric motor described herein, the rotor including the permanent magnets located about its periphery has an outside diameter of 158 mm and a depth or length of 70 mm, there is an air gap of approximately 1.2 mm, the stator has an outside diameter of 205.2 mm and a depth or length of 70 mm with the wire windings extending from the stator teeth 17 mm on one end and 20 mm on the other end (for a total of 107 mm in depth or length), and the overall outside dimensions of the motor casing, including radial heat fins and with the end plates attached, of 250 mm tall by 220 mm wide by 144 mm deep. This example implementation of the electric motor described herein was found to have a peak output power of 38 kW with a weight of 17 kg thereby providing a power density of 2.2 kW/kg. It is believed that a passively air cooled electric motor with this size, torque and power has not been known to exist previously much less one that can operate in environments where outside contaminants are likely to be encountered.

The disclosed apparatus has been explained herein with reference to several embodiments. Other embodiments will be apparent to those skilled in the art in light of this disclosure. Certain aspects of the described apparatus may readily be implemented using configurations other than those described in the embodiments herein, or in conjunction with elements other than those described herein. For example, in an alternative embodiment, the stator can include additional teeth with wire windings thereon to thereby provide more than two sets of phase windings to be combined into the phase A, phase B and phase C leads or may include a single set of phase windings for the phase A, phase B and phase C leads. Likewise, the number of permanent magnets located about the periphery of the rotor can vary from that shown in the figures.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the herein-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:
1. A three-phase electric motor comprising:
a motor casing having an open end with three half-round lead exit holes along an edge of the open end;
a stator sized to fit within the motor casing, the stator having a multiplicity of inwardly directed radial teeth with wire windings arranged thereon comprising:
  a first set of three stator windings, each winding of the first set of three stator windings having a positive lead and negative lead, and wherein each negative lead of the first set of three stator windings is electrically connected to form a first Wye connection;
  a second set of three stator windings, each winding of the second set of three stator windings having a positive lead and negative lead, and wherein each negative lead of the second set of three stator windings is electrically connected to form a second Wye connection;
  and wherein:
    a first positive lead of the first set of three stator windings is electrically connected to a first positive lead of the second set of three stator windings and to a first lead cable to form a phase A lead;
    a second positive lead of the first set of three stator windings is electrically connected to a second positive lead of the second set of three stator windings and to a second lead cable to form a phase B lead;
    a third positive lead of the first set of three stator windings is electrically connected to a third positive lead of the second set of three stator windings and to a third lead cable to form a phase C lead;
    and wherein each of the phase A lead, the phase B lead and the phase C lead is covered with a separate heat shrink tubing thereby electrically insulating and increasing an overall outside diameter of a portion of each respective lead;
a rotor having a multiplicity of permanent magnets and sized to fit within the stator; and,
an end plate configured to attach to and cover the open end of the motor casing, an edge of the end plate including three half-round lead exit holes aligned with the three half round lead exit holes along the edge of the open end of the motor casing thereby creating three fully round lead exit holes when the end plate is attached to the motor casing and wherein:
  a first fully round lead exit hole of the three fully round lead exit holes is configured to pass the phase A lead and wherein the first fully round lead exit hole has an inside diameter that is smaller than an outside diameter of the phase A lead with the separate heat shrink tubing;
  a second fully round lead exit hole of the three fully round lead exit holes is configured to pass the phase B lead and wherein the second fully round lead exit hole has an inside diameter that is smaller than an outside diameter of the phase B lead with the separate heat shrink tubing; and
  a third fully round lead exit hole of the three fully round lead exit holes is configured to pass the phase C lead and wherein the third fully round lead exit hole has an inside diameter that is smaller than an outside diameter of the phase C lead with the separate heat shrink tubing;
  whereby the three fully round lead exit holes compresses the separate heat shrink tubing of the phase A lead, the phase B lead and the phase C lead when the end plate is attached to the open end of the motor casing thereby preventing unwanted outside contaminants from passing between the phase A lead, the phase B lead and the phase C lead and the three fully round lead exit holes into the electric motor.

2. The three-phase electric motor of claim 1 wherein the first Wye connection is not electrically connected to the second Wye connection.

3. The three-phase electric motor of claim 1 wherein the phase A lead covered with the separate heat shrink tubing further comprises a crimped wire barrel around the first positive lead of the first set of three stator windings, the first positive lead of the second set of three stator windings, and the first lead cable inside the heat shrink tubing at a location along the phase A lead to remain inside the electric motor when the end plate is attached to the motor casing.

4. The three-phase electric motor of claim 1 wherein the phase B lead covered with the separate heat shrink tubing further comprises a crimped wire barrel around the second positive lead of the first set of three stator windings, the second positive lead of the second set of three stator windings, and the second lead cable inside the heat shrink tubing at a location along the phase B lead to remain inside the electric motor when the end plate is attached to the motor casing.

5. The three-phase electric motor of claim 1 wherein the phase C lead covered with the separate heat shrink tubing further comprises a crimped wire barrel around the third positive lead of the first set of three stator windings, the third positive lead of the second set of three stator windings, and the third lead cable inside the heat shrink tubing at a location along the phase C lead to remain inside the electric motor when the end plate is attached to the motor casing.

6. The three-phase electric motor of claim 1 wherein the rotor has an outside diameter of 158 mm and a depth of 70 mm.

7. The three-phase electric motor of claim 6 wherein the stator has an outside diameter of 205.2 mm and a depth of 70 mm and wherein the first and second set of three stator windings extends 17 mm on one end and 20 mm on the other end.

8. The three-phase electric motor of claim 7 wherein an air gap between the outside diameter of the rotor and an inside diameter of the stator is approximately 1.2 mm.

9. The three-phase electric motor of claim 8 wherein the motor casing is 250 mm tall and 220 mm wide.

10. The three-phase electric motor of claim 9 wherein the motor casing with the end plate attached is 144 mm deep.

11. The three-phase electric motor of claim 10 wherein the motor has a peak output power of 38 kW, a weight of 17 kg and a power density of 2.2 kW/kg.

12. The three-phase electric motor of claim 1 wherein the phase A lead, the phase B lead and the phase C lead, each covered with a separate heat shrink tubing is 11.5 mm in outside diameter and each of the three fully round exit holes is 11.0 mm in interior diameter.

13. A three-phase electric motor comprising:
a motor casing having an open end with three half-round lead exit holes along an edge of the open end;
a stator sized to fit within the motor casing, the stator having a multiplicity of wire windings arranged thereon comprising a heat shrink tubing covered phase A lead, a heat shrink tubing covered phase B lead, and a heat shrink tubing covered phase C lead;
a rotor having a multiplicity of permanent magnets and sized to fit within the stator; and
an end plate configured to attach to and cover the open end of the motor casing, an edge of the end plate including three half-round lead exit holes aligned with the three half round lead exit holes along the edge of the open end of the motor casing thereby creating three fully round lead exit holes when the end plate is attached to the motor casing and wherein:
a first fully round lead exit hole of the three fully round lead exit holes is configured to pass the heat shrink tubing covered phase A lead and wherein the first fully round lead exit hole has an inside diameter that is smaller than an outside diameter of the heat shrink tubing covered phase A lead;
a second fully round lead exit hole of the three fully round lead exit holes is configured to pass the heat shrink tubing covered phase B lead and wherein the second fully round lead exit hole has an inside diameter that is smaller than an outside diameter of the heat shrink tubing covered phase B lead; and
a third fully round lead exit hole of the three fully round lead exit holes is configured to pass the heat shrink tubing covered phase C lead and wherein the third fully round lead exit hole has an inside diameter that is smaller than an outside diameter of the heat shrink tubing covered phase C lead;
whereby the three fully round lead exit holes compress the heat shrink tubing covered phase A lead, the heat shrink tubing covered phase B lead and the heat shrink tubing covered phase C lead when the end plate is attached to the open end of the motor casing thereby preventing unwanted outside contaminants from passing between the heat shrink tubing covered phase A lead, the heat shrink tubing covered phase B lead and the heat shrink tubing covered phase C lead and the three fully round lead exit holes into the electric motor.

14. The three-phase electric motor of claim 1 wherein the heat shrink tubing covered phase A lead further comprises a crimped wire barrel at a location along a portion of the heat shrink tubing covered phase A lead to remain inside the electric motor when the end plate is attached to the motor casing.

15. The three-phase electric motor of claim 1 wherein the heat shrink tubing covered phase B lead further comprises a crimped wire barrel at a location along a portion of the heat shrink tubing covered phase B lead to remain inside the electric motor when the end plate is attached to the motor casing.

16. The three-phase electric motor of claim 1 wherein the heat shrink tubing covered phase C lead further comprises a crimped wire barrel at a location along a portion of the heat shrink tubing covered phase C lead to remain inside the electric motor when the end plate is attached to the motor casing.

* * * * *